(12) United States Patent
Yablokov et al.

(10) Patent No.: US 9,147,069 B2
(45) Date of Patent: Sep. 29, 2015

(54) SYSTEM AND METHOD FOR PROTECTING COMPUTER RESOURCES FROM UNAUTHORIZED ACCESS USING ISOLATED ENVIRONMENT

(71) Applicant: Kaspersky Lab ZAO, Moscow (RU)

(72) Inventors: Victor V. Yablokov, Moscow (RU); Evgeny Y. Eliseev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 226 days.

(21) Appl. No.: 14/039,674

(22) Filed: Sep. 27, 2013

(65) Prior Publication Data

US 2014/0181896 A1    Jun. 26, 2014

(30) Foreign Application Priority Data

Dec. 25, 2012 (RU) ............................... 2012156432

(51) Int. Cl.
 *G06F 21/53*  (2013.01)
 *G06F 21/62*  (2013.01)
 (Continued)

(52) U.S. Cl.
 CPC ............... *G06F 21/53* (2013.01); *G06F 9/468* (2013.01); *G06F 21/629* (2013.01); *H04L 63/10* (2013.01); *H04L 63/20* (2013.01);
 (Continued)

(58) Field of Classification Search
 CPC ......................... G06F 21/53; G06F 2221/2149
 USPC .............................................. 726/29, 26, 27
 See application file for complete search history.

(56) References Cited

U.S. PATENT DOCUMENTS 6,775,780 B1   8/2004 Muttik
6,799,316 B1   9/2004 Aguilar et al.
6,973,577 B1  12/2005 Kouznetsov
(Continued)

FOREIGN PATENT DOCUMENTS

RU        2427890 C2    8/2011
WO    2008048665 A2    4/2008

OTHER PUBLICATIONS

Saltzer et al.; The protection of information in computer systems; Published in: Proceedings of the IEEE (Volume:63 , Issue: 9 ); pp. 1278-1308; Date of Publication: Sep. 1975; IEEE Xplore.*
(Continued)

*Primary Examiner* — Bradley Holder
(74) *Attorney, Agent, or Firm* — Arent Fox LLP; Michael Fainberg (57) ABSTRACT

Disclosed system and methods for protecting computer resources from unauthorized access. The system provides a library of handler functions that control access of applications to protected resources on a computer device. The system associates a security policy with the library to handler functions. The security policy specifies access rules for accessing protected resources by the applications. The system also modifies applications to access the library of handler functions instead of corresponding application program interface (API) functions of the computer device. When a handler function receives an API function call from a modified application, it may determine if the received API function call complies with the access rules. When the API function call complies with the access rules, the handler function performs the API function call from the application to the protected resources. When the API function call violates the access rules, the handler function block that API function call.

17 Claims, 8 Drawing Sheets

(51) Int. Cl.
*H04L 29/06* (2006.01)
*G06F 9/46* (2006.01)

(52) U.S. Cl.
CPC ............... *G06F 2221/2107* (2013.01); *G06F 2221/2141* (2013.01); *G06F 2221/2149* (2013.01)

(56) References Cited

U.S. PATENT DOCUMENTS

| | | | | |
|---|---|---|---|---|
| 7,035,279 | B2* | 4/2006 | Bruckman | 370/460 |
| 7,590,980 | B1* | 9/2009 | Clubb et al. | 717/163 |
| 7,783,884 | B2* | 8/2010 | Nakano et al. | 713/175 |
| 8,051,480 | B2 | 11/2011 | Mahaffey | |
| 8,099,596 | B1 | 1/2012 | Rusakov et al. | |
| 8,332,464 | B2* | 12/2012 | Dispensa et al. | 709/203 |
| 8,588,424 | B2* | 11/2013 | Yamada et al. | 380/281 |
| 2002/0019887 | A1* | 2/2002 | Moore | 709/328 |
| 2002/0065776 | A1 | 5/2002 | Calder et al. | |
| 2002/0085021 | A1* | 7/2002 | Sullivan et al. | 345/716 |
| 2002/0118700 | A1* | 8/2002 | Bruckman | 370/460 |
| 2002/0180783 | A1* | 12/2002 | Broussard | 345/744 |
| 2002/0180790 | A1* | 12/2002 | Broussard | 345/762 |
| 2003/0033443 | A1* | 2/2003 | Igotti | 709/328 |
| 2003/0177284 | A1* | 9/2003 | De Bonet | 709/328 |
| 2003/0187869 | A1* | 10/2003 | de Bonet | 707/102 |
| 2004/0039924 | A1 | 2/2004 | Baldwin et al. | |
| 2004/0237071 | A1* | 11/2004 | Hollander et al. | 717/124 |
| 2007/0283151 | A1* | 12/2007 | Nakano et al. | 713/168 |
| 2008/0313648 | A1* | 12/2008 | Wang et al. | 719/315 |
| 2009/0113444 | A1* | 4/2009 | Hackborn et al. | 719/312 |
| 2010/0175104 | A1* | 7/2010 | Khalid | 726/1 |
| 2012/0222123 | A1 | 8/2012 | Williams et al. | |

OTHER PUBLICATIONS

Graham et al.; Protection: principles and practice; Published in: Proceeding AFIPS '72 (Spring) Proceedings of the May 16-18, 1972, spring joint computer conference; pp. 417-429; ACM Digital Library.*

Fraser T et al: "Hardening Cots Software With Generic Software Wrappers", Proceedings of the 1999 IEEE Symposium on Security and Privacy. Oakland, CA, May 9-12, 1999; [Proceedings of the IEEE Symposium on Security and Privacy], Los Alamitos, CA : IEEE Comp. Soc. US. May 9, 1999, pp 2-16, XP000871969, ISBN: 978-0-7695-0177-2.

* cited by examiner

SYSTEM AND METHOD FOR PROTECTING COMPUTER RESOURCES FROM UNAUTHORIZED ACCESS USING ISOLATED ENVIRONMENT

CROSS-REFERENCE TO RELATED APPLICATIONS

This application claims benefit of priority under 35 U.S.C. 119(a)-(d) to a Russian Application No. 2012156432 filed on Dec. 25, 2012, which is incorporated by reference herein.

TECHNICAL FIELD

The disclosure relates generally to the field of information security, and more specifically to systems and methods for protecting computer resources from unauthorized access by applications placed in an isolated environment.

BACKGROUND

The number of mobile communication devices is constantly growing, and they have penetrated into all areas of human life. The most popular of these are telephones, smartphones, notebooks, tablets and navigation systems. Mobile devices are primarily used for communication and entertainment. In parallel with the development of these devices, new wireless communication systems, networks and protocols are also being developed. The transmission of data from one device to another and the exchange of information are tasks that even an inexperienced users can perform without difficulty. But the development of new technologies brings not only benefits, but also creates problems.

On one hand, the development of mobile devices and wireless communication systems simplifies human interaction, facilitates exchange of information, and erases geographical boundaries. On the other hand, new technologies create new security problems. The ease of copying and exchanging of information causes leaks, whether deliberate or accidental, of confidential personal or business information from organization networks. Therefore, information security specialists responsible for administration of information security infrastructure need to extra vigilant in protecting corporate IT systems in order prevent information leaks and various security breaches.

In addition, the growth in popularity of mobile platforms, such as Android and iOS, is attracting the attention of hackers who have various goals—from a desire to play jokes or show off, to the theft of confidential information for the purpose of extortion and blackmail. As a result of this, computer threats, such as viruses, worms and other types of malware, which were previously characteristic of desktop computers are beginning to appear on mobile platforms as well. New threats unique to mobile devices are also appearing, such as Trojan horses, which after being installed on a mobile device, send SMS messages to telephone numbers or use geolocation services to track the movements of the device user.

In light of the foregoing, it is becoming apparent that proactive steps must be taken to reduce the risk of information leaks and protect the users of mobile devices and organizations from unauthorized access by cybercriminals. Security measures for both individual users and organizations have migrated from desktop computers to mobile devices and generally have a narrowly focused, local nature and are based on possible scenarios leading to the transfer of information from the informational environment of an organization. The three main scenarios are network, local, and due to the loss of a data storage medium. Different methods have been developed to address these problems. However, the current security solutions are ineffective and, in certain cases, hard to implement across different mobile platforms and devices due to their narrow local focus and lack of a general technical design concept.

SUMMARY

Disclosed system, method and computer program product for protecting computer resources from leaks and unauthorized access. In one aspect of the invention, the system provides a library of handler functions that control access of applications to protected resources on a computer device. The protected resources may include network resources, file system, operating system, and other applications or programs. The system associates a security policy with the library to handler functions. The security policy specifies access rules for accessing protected resources by the applications. The system also modifies applications to access the library of handler functions instead of corresponding application program interface (API) functions of the computer device. When a handler function receives an API function call from a modified application, it may determine if the received API function call complies with the access rules. When the API function call complies with the access rules, the handler function performs the API function call from the application to the protected resources. When the API function call violates the access rules, the handler function block that API function call.

In another aspect, the system may modify the application by replacing one or more classes or methods of the application that perform API function calls to the protected resources with one or more function calls to corresponding handler functions contained in the library. The replacement of classes or methods of the application may include replacing one or more classes or methods contained in an application file having *.dex extension.

In another aspect, the system may modify the application by placing the application into an isolated environment, such as a container.

Yet in another aspect, the system may place a plurality of applications into the container and associate the same security policy with all applications in the container.

In another aspect, the protected resources may be encrypted and the handler function may be configured to decrypt encrypted data and transmit decrypted data to the application.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products protecting computer resources from unauthorized access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Modern solutions in the field of protection of an organization's data on the whole handle the task placed on them, but the proposed systems have many components, consist of different modules, are hard to configure and are poorly interconnected with each other. The present invention makes it possible to create a single system that makes it possible to provide secure exchange of data within an organization in the framework of a unified security concept, i.e., to solve all the problems confronting specialists in the field of information security by adopting a single approach, rather than solving each problem separately with a narrow focus. In particular, the present invention will enable a transmittal of information between mobile communication devices without fear of information leaks or divulging of business or state secrets. The invention will also provide protection against threats emanating from malware.

In order to provide security for the data transmission network of an organization, it is necessary to oversee all of the data being transmitted within the organization, keep track of devices getting into the organization's network from the outside, and keep track of events on devices and the data with which these devices are working. Any given mobile device is generally under the control of a mobile operating system (hereafter, OS), the most popular mobile OS being Google Android, Apple iOS, Symbian, BlackBerryOS, Windows- Phone and so on. The applications installed on the devices afford access to the resources of the mobile device and to the communication ports via interfaces that are provided by the operating system. Therefore, it is necessary to monitor the installed applications or the portion of applications that are critical to the needs of the security policy. Under this definition come all applications working with critical organizational data, where critical data means data requiring protection due to possible loss or damage if it should be deliberately or accidentally divulged, altered, or lost. It also includes data whose loss may adversely affect the operation of the organization. The security policy is a set of guiding principles, rules, procedures and practical approaches in the area of information security that govern the management, protection and distribution of valuable information. An example of such a policy is presented below:

prohibition to copy/past from an application;

prohibition to send data from an application by external interfaces (mail, bluetooth, etc.);

user of password to enter the application, its security, frequency of requests;

forced shutdown of an application if the user is not using it and closes it down;

removal of local copies of all files;

allowing the application to access the network only through an encrypted channel (rerouting of traffic through a special channel);

storage of the application data on company's cloud servers instead of a local storage;

mandatory user authentication by login and password through company server for using the application and access to data;

limiting access to data depending on location of the device, time of day, surrounding devices (e.g., allow it only in the office within the visibility of a particular WiFi network and only through this network);

forced removal of all corporate data and closure of access to company resources in the event of detection of a virus or receiving an unauthorized access to the system of the device;

forced removal of all corporate data in containers in the event of loss of a device or a person leaving the company.

The resources of a mobile device include those means of the processing system of a device that can be assigned to the process of data processing for a particular time slot. The primary resources of a computer system are the processors, areas of RAM memory, sets of data, and peripheral devices. The interface provided by the operating system to interact with the resources of the device is realized as an API (application programming interface) function. In this way, the application can interact with the network, perform operations with files, with memory, and so on. According to one aspect of the invention, one approach for monitoring and controlling access of applications to the critical resources of a mobile device is via modification of the code of the application that call critical API functions of the OS. Here and afterwards by the term critical is meant actions or entities as defined by the security policy.

Figure 1A:
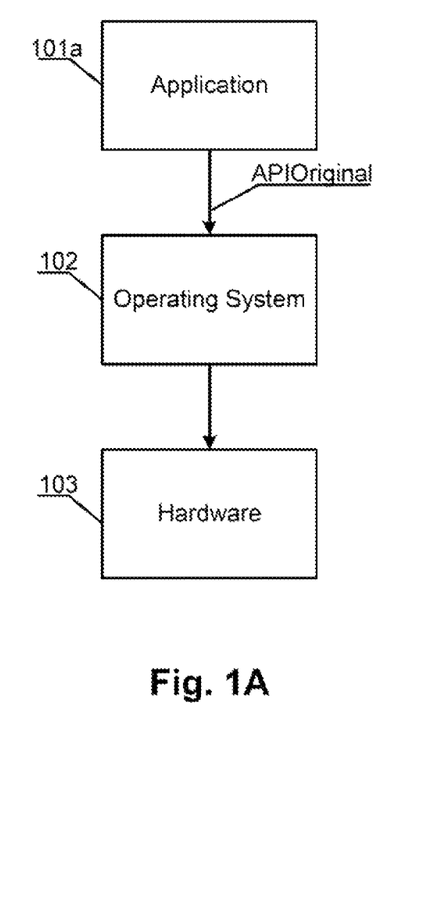
FIG. 1A is a flow diagram illustrating the typical interaction of an application with the operating system and the hardware of a mobile device.
Figure 1B:
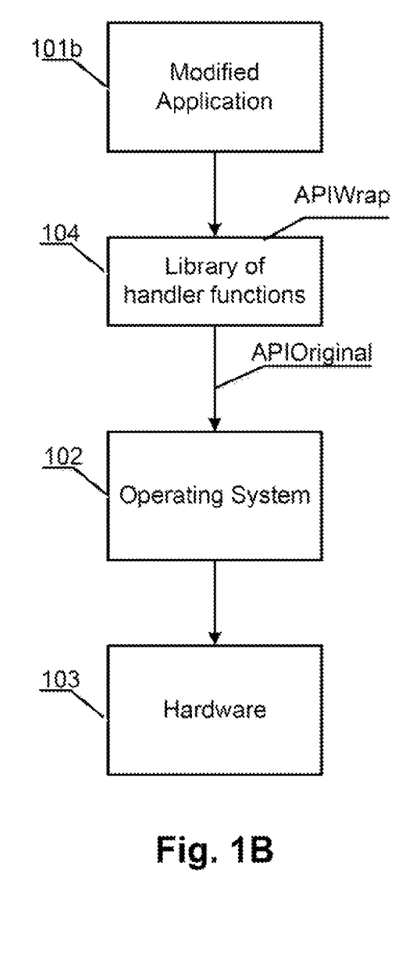
FIG. 1B is a flow diagram illustrating the interaction of an application with an operating system and hardware of a mobile device in accordance with aspects of the present invention.

FIG. 1A shows a diagram of the interaction of an application with an OS and hardware of a computer device, such as a mobile phone, tablet computer, laptop, desktop or the like. The user application 101a accesses, via API functions, the OS 102, which in turn provides the direct access to the hardware 103. FIG. 1B shows a diagram of interaction modified in accordance with one aspect of the present invention, in which calls to the original API functions by the application 101a are replaced by the calls to the modified API functions, in one example aspect, the modified API functions may be provided by a library of handler functions 104, while the library 104 is called by the original API functions provided by the OS 102.

In one example aspect, a hander function may be a function that includes a functionality of another function.

Figure 2:
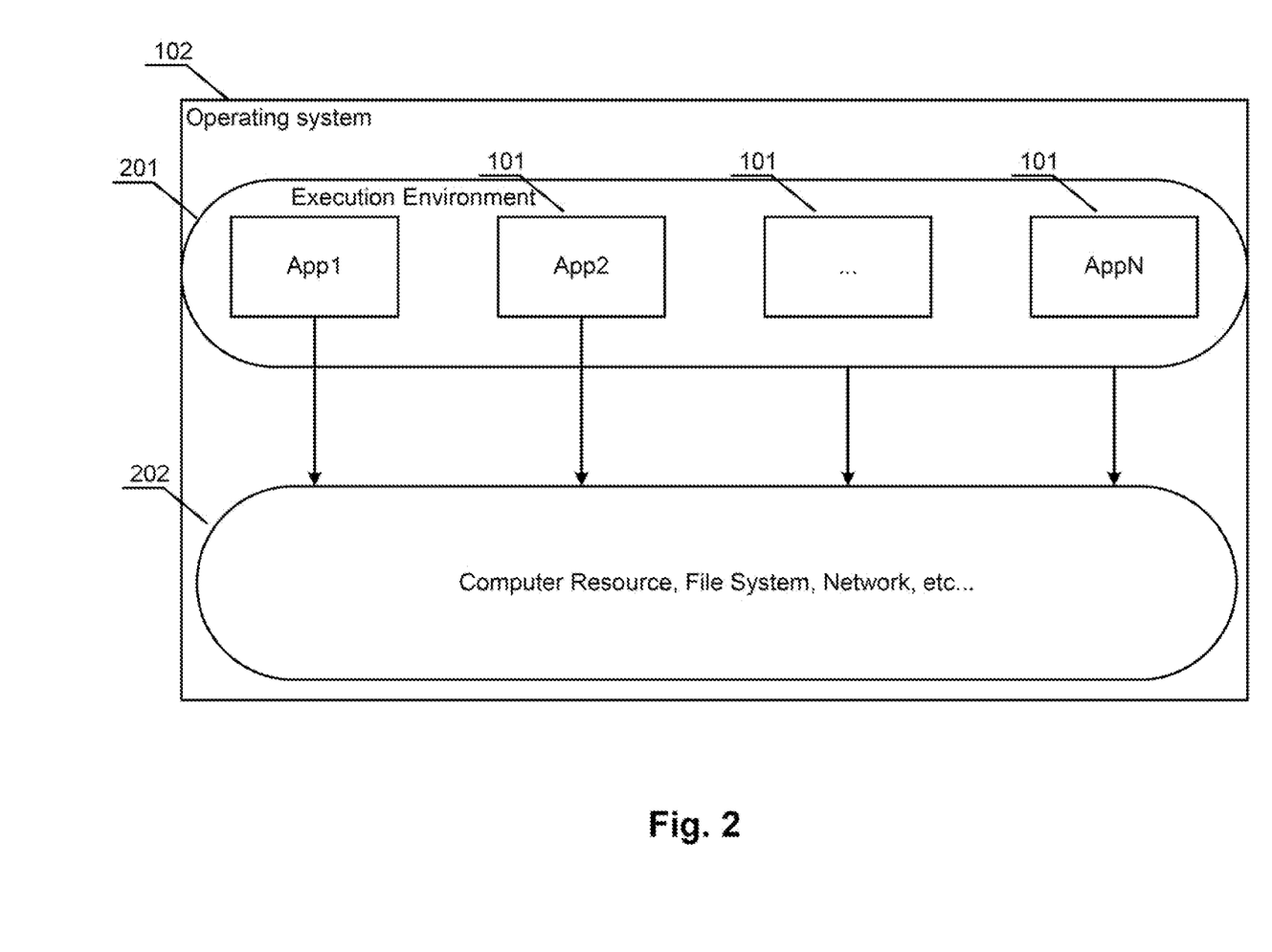
FIG. 2 is a block diagram illustrating the structure of a typical mobile operating system.

FIG. 2 shows a simplified diagram of a typical structure of a mobile OS. Generally, the operating system (OS) 102 provides an interface for interacting with the physical components of the mobile device. In one aspect, the OS 102 includes user applications 101 operating in an execution environment 201, which is a component of the OS 102 operable to support the execution of applications, such as a Java virtual machine; and the environment 201 through which the applications 101 interact with the resources 202 of the operating system 102.

Figure 3:
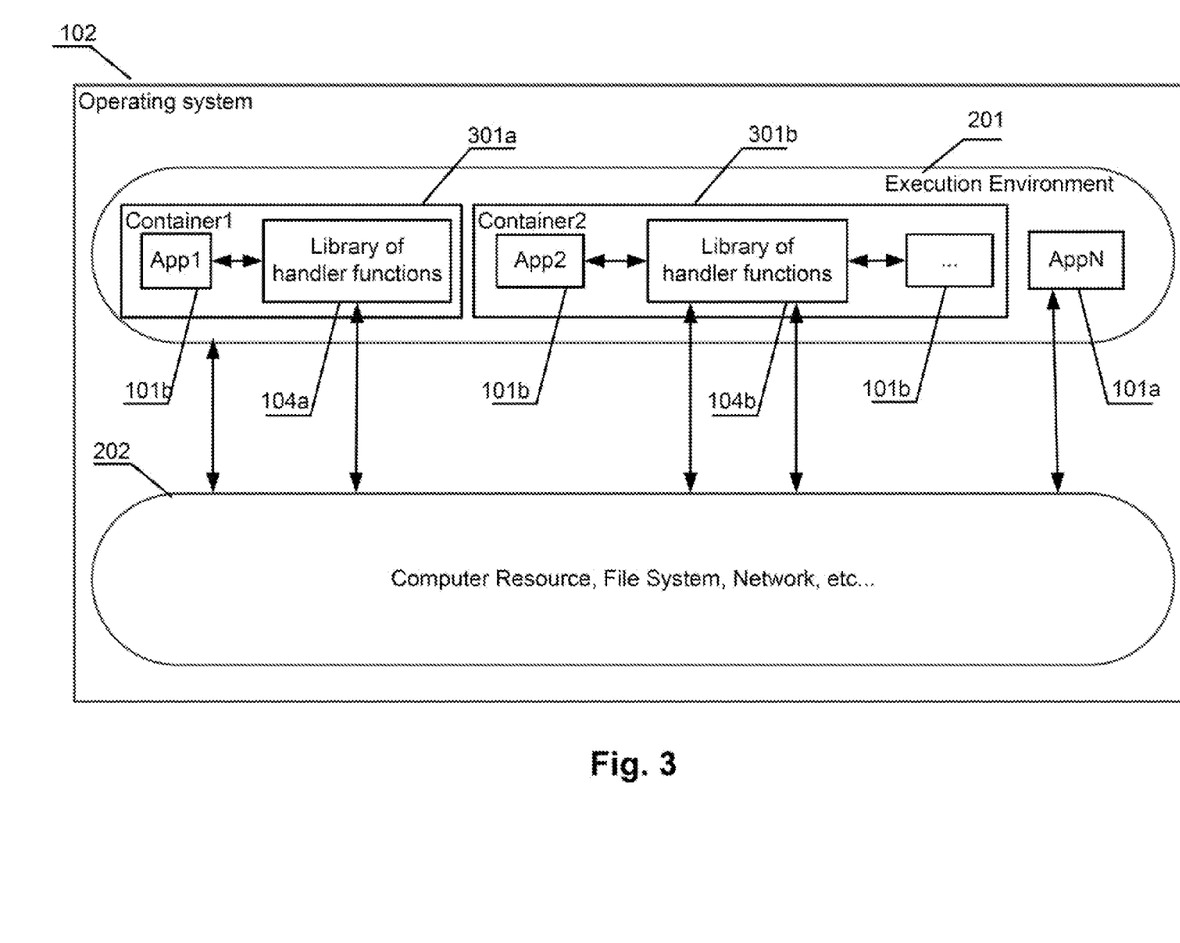
FIG. 3 is a block diagram illustrating a modified version of the structure of the mobile operating system in accordance with aspects of the present invention.

FIG. 3 shows a modified version of the structure of the mobile OS of FIG. 2 in accordance with aspects of the present invention. To gain control over an application being executed on the OS 102, the OS 102 may be modified to include a system for protecting computer resources 202 from unauthorized access by the application 101. The system may be implemented as a secure environment 301, such as a container 301, for isolating applications 101b from the execution environment 201. The container 301 may include a library of handler functions 104 which are used to control access of applications 101 to critical system resources. In one aspect, the applications 101b may be placed in the container 301 and modified, e.g., stripped of the ability to directly call APIs of OS 102. The environment 201 now interacts with the container 301, which is a secure environment for the application 101b. In order to access protected system resources 202, the modified application 101b accesses the library of handler functions 104, which in turn checks associated security policies to determine whether application 101b is allowed to access the requested system resources 202. If security policy indicates that access to the requested system resource is allowed, the handler function from the library of handler functions 104 will call the requested API of the OS 102. In this manner, it is possible to monitor both incoming and outgoing network traffic, access to the file system, and the interaction of the application 101b with other applications 101a and 101b placed in the container or not.

In one aspect, a group of two or more applications 101b may be placed in the same container 301b. Such applications may include applications with similar functionality, which may be covered by the same security policy associated with the container 301b.

Figure 4:
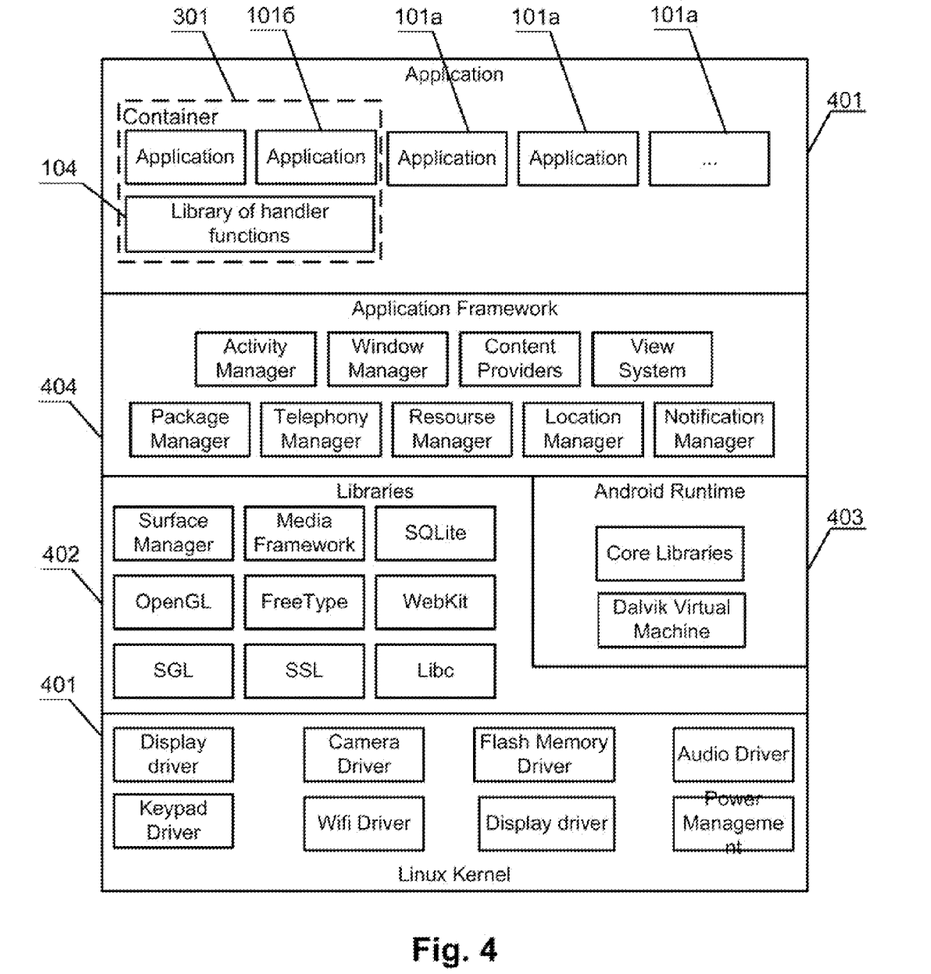
FIG. 4 is a block diagram illustrating the architecture of the mobile operating system Android OS in accordance with aspects of the present invention.

FIG. 4 illustrates an example implementation of the system of the present invention in a popular mobile operating platform Android OS. The Android architecture is based on a Linux kernel 401. The kernel 401 is responsible for such system services as security, memory and process management; it includes a network stack and a model of drivers. The next level in the hierarchical structure is libraries 402 written in C/C++ and used by different components of the OS. An important part of the architecture is Android Runtime (the application execution environment) 403. The execution environment consists of a Java virtual machine Dalvik and a set of basic libraries. Dalvik executes files in a special format, .dex, optimized for devices with a small amount of memory. The basic libraries are written in Java language and include a large set of classes which support a broad range of functional capabilities. The next level is the Application Framework 404. This level is a tool box that is used by all applications. At the top of the hierarchy are the Applications (the application level) 401. Android does not distinguish between basic telephone applications and third-party software. Thus, the key components such as dialling number, desktop, Gmail client, and so forth can be replaced by alternative analogs or modified, which lets one use the present invention on this platform. But the platform has a peculiarity in that applications are executed in a sandbox (a rigorously monitored set of resources for executing a guest program) and do not have the right to modify components situated on the same level or lower levels. To monitor applications in the Android OS, the application is placed in a container 301, where the .dex file of the application 101a is modified by replacing the critical classes with the names of classes that are specified in the library 104. The following are examples of critical classes and methods that may be modified:

```
java.io.*
java.lang.Runtime.loadlibrary( )
java.lang.Runtime.exec( )
android.app.ActivityManager.getRunningServices( )
javax.crypto.Cipher
java.lang.System.loadLibrary( )
java.lang.ClassLoader.getResourceAsStream( )
android.webkit.WebView
android.telephony.SmsMessage
android.content.BroadcastReceiver.abortBroadcast( )
android.app.Activity.startActivity( )
android.content.Context.getClassLoader( )
android.content.Context.startActivity( )
android.content.Context.getSystemService( )
java.net.*
java.lang.Class.getClassLoader( )
java.lang.Class.getClasses( )
java.lang.Class.getResourceAsStream( )
android.telephony.SmsManager.*
```

The modification provides control over the critical activity of an application. The modification may be done at the stage of loading the application, or the copy of an already installed application may be modified. If a critical action is attempted, the application 101b will not be able to perform it, since the original class has been replaced by the class described in the library 104. Therefore, the corresponding method will first be called up from the library 104 and a check will be done for compliance of the action being performed with the security policy. If the critical action does not violate the rules specified in the policy, the original method will be called up. For example, a security policy of the organization prohibits certain applications to send short text messages from a mobile device. The system of the present invention may be used to intercept attempts by applications to send text messages. In this case, the following methods (i.e., functions) will be critical to the operation of the application:

```
android.telephony.gsm.SmsManager.sendTextMessage( )
android.telephony.gsm.SmsManager.sendMultipartTextMessage( )
android.telephony.gsm.SmsManager.sendDataMessage( )
android.telephony.SmsManager.sendTextMessage( )
android.telephony.SmsManager.sendMultipartTextMessage( )
android.telephony.SmsManager.sendDataMessage( )
java.lang.reflect.Method.invoke( )
```

To control access of the application 101 to these methods, the application calls to the above-listed methods may be modified. After placing the application 101 in the container 103, the critical methods may be replaced in the application. For example, the method:

```
android.telephony.SmsManager.getDefault( ).sendTextMessage
("<phone_number>",null,"<message_text>", null, null),
``` may be replaced with the call to the following method:

```
com.kaspersky.container.hooks.android_telephony_SmsManager.
sendTextMessage(android.telephony.SmsManager.getDefault( ),
"<phone_number>", null, "<message_text>", null, null);
```

The description of these methods may be found in the library of handler functions 104, where a check is performed to make sure that the requirements of the security policy associated with the given application are fulfilled. Following is an example handler function(s) for the above method:

```
package com.kaspersky.container.hooks;
    public class android_telephony_SmsManager {
        public static void sendTextMessage(Object impl, java.lang.String
arg1, java.lang.String arg2, java.lang.String arg3, android.app.
PendingIntent arg4, android.app.PendingIntent arg5) {
            if
(!PolicyManager.get("sms").allow(String.valueOf(arg1),String.
valueOf(arg3))) { return; }
                ((android.telephony.SmsManager)impl).sendTextMessage(arg1,
arg2, arg3, arg4, arg5);
            }
        public static void sendMultipartTextMessage(Object impl,
java.lang.String arg1, java.lang.String arg2, java.util.ArrayList arg3,
java.util.ArrayList arg4, java.util.ArrayList arg5)
{
            if
(!PolicyManager.get("sms").allow(String.valueOf(arg1),String.
valueOf(arg3))) { return; }
                ((android.telephony.SmsManager)impl).
sendMultipartTextMessage(arg1, arg2, arg3, arg4, arg5);
            }
        public static void sendDataMessage(Object impl, java.lang.String
arg1, java.lang.String arg2, short arg3, byte[ ] arg4, android.app.
PendingIntent arg5, android.app.PendingIntent arg6) {
            if
(!Policy Manager.get("sms").allow(String.valueOf(arg1),
String.valueOf(arg4))) { return; }
                ((android.telephony.SmsManager)impl).sendDataMessage(arg1,
arg2, arg3, arg4, arg5, arg6);
            }
        }
```

This example code function contains description of three handler functions used to replace the original critical methods. Each of the functions checks to make sure the parameters used are permitted. If the requirements of the security policy are fulfilled, the original methods are called up. If the arguments do not withstand the check, the transmission of the text message will be halted in the given example. It is also possible not only to halt the message, but also to send an empty message, warn the user, close the application, and so on.

In one aspect, the system of the present invention may be used to provide security during transmission of information within an organization. There are a limited number of applications with which the employees of the corporation work, but an employee can also use other applications on his mobile device for personal needs, and so it is necessary to divide the applications into at least two groups and determine safety policies for each group. A security policy is established for applications that work even partly with confidential data, data constituting a business or state secret (such as a ban on sending data in unprotected form, a ban on copying on removable media, and so on), while no such restrictions are placed on the other applications. Examples of protected applications can be the following:

email programs;
programs for working with documents;
programs for managing tasks;
programs for participating in online meetings;
programs for exchanging messages, contacts, information between company employees;
programs for telephone communication between employees using the corporate telephone infrastructure;
programs for access to corporate sources;
programs for online monitoring;
thin clients for access to corporate services;
utilities for monitoring and control of business processes of the company (financial system, control of purchasing, assets, etc.);

In one aspect, the system of the present invention may be used to ensure that a security policy is implemented on mobile devices connected to the corporate network. For example, all critical applications 101 may be placed in containers 301, which may have a security policy associated therewith, which will ensure that all applications placed in the container comply with the associated security policy, which will be a required condition for working with the protected data on the corporate network. In one aspect, the applications 101a may be placed in a container 301 on a corporate server, and the user may obtain the container of application directly from the server. One example method for creating a container of applications for use one a mobile device is provided next; a user of the mobile device sends a request for access to the corporate network from the mobile device (such as a request to the system administrators, a specially formulated request to the security server, and so on); on the basis of the request, the level of rights and the set of applications needed by the user in order to work are determined and a container is generated, containing all necessary applications configured in accordance with an appropriate security policy (the security policy may be individually configured for each particular user and may be dynamically updated); the container is then copied to the user's device, in one aspect, the data inside the container may be encrypted, and the channels of interaction of the isolated environment with the outside world are also protected; access to the container is allowed only by means of authorization.

Figure 5:
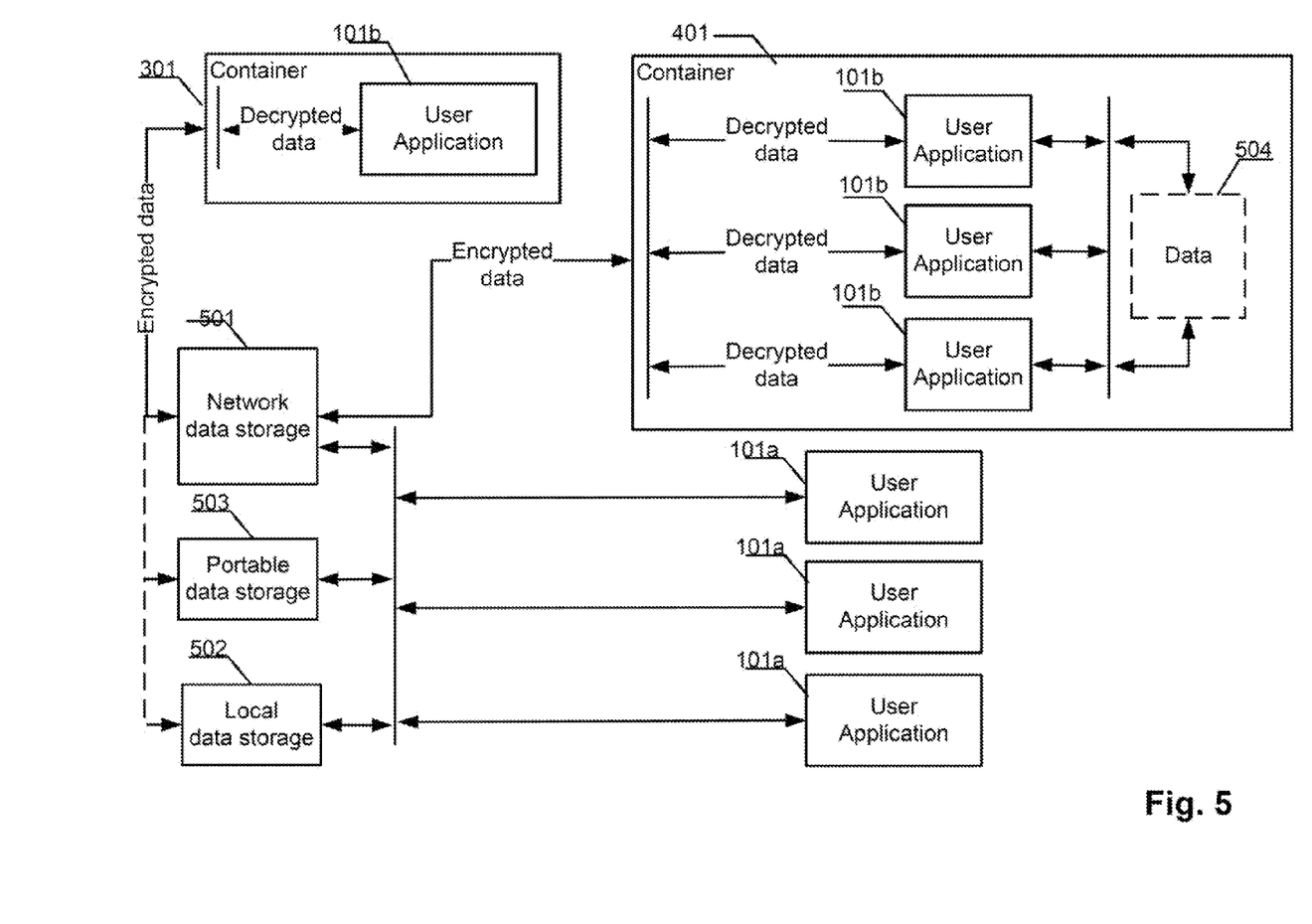
FIG. 5 is a block diagram illustrating data exchange between a mobile device and data storages in accordance with aspects of the present invention.

FIG. 5 shows an example data exchange between a mobile device and different data storages in a corporate network in accordance with aspects of the present invention. The critical data sent through the corporate network and stored in a network data storages 501, portable data storage 503 or local data storage 502 may be encrypted to ensure security. When access needed to the protected (i.e., encrypted) data, the application 101b goes through the container 301 or 401 to access, for example, the network data storage 501. The handler functions of the container 301 or 401 determine if the application has permission to access the requested data, and, if access is allowed by the associated security policy, the handler function requests the data from the network data storage 501. In one aspect, the container receives the data in encrypted form, decrypts it and transmits decrypted data to the application 101b, and the application 101b works with the data. In accordance with example security policies, only editing of documents may be allowed to the user from his mobile device; copying and storing on a local data storage 502 may be prohibited, and saving data inside the container 401 may only be possible for temporary files 504 which are deleted upon exiting of the application 101b. The containers 301 and 401 keep track of all actions of the application 101b on critical data (e.g., disk access, network access, transmittal of data by wireless channels, access to the clipboard, etc.), and all such operations are checked for compliance with the rules established by the security policy. The user applications 101a not placed in the container may have access to the network, to portable and local media, and to the ports for wireless data transmission.

In one aspect, the user can obtain protected applications from outside of the corporate network, and place in a container only applications needed for work directly on the user device. To do that, in one aspect of the invention, the user may obtain a specially designed tool kit from the network, which is used to modify user-selected application, as explained above, place the modified applications in to one or more containers, and configure appropriate security policies for each container based on, for example, type or functionality of the applications placed in each container. As explained above, the container may also include appropriate library of handler functions that check application calls for compliance with associated security policies and block or allow application calls to critical network resources.

Figure 6:
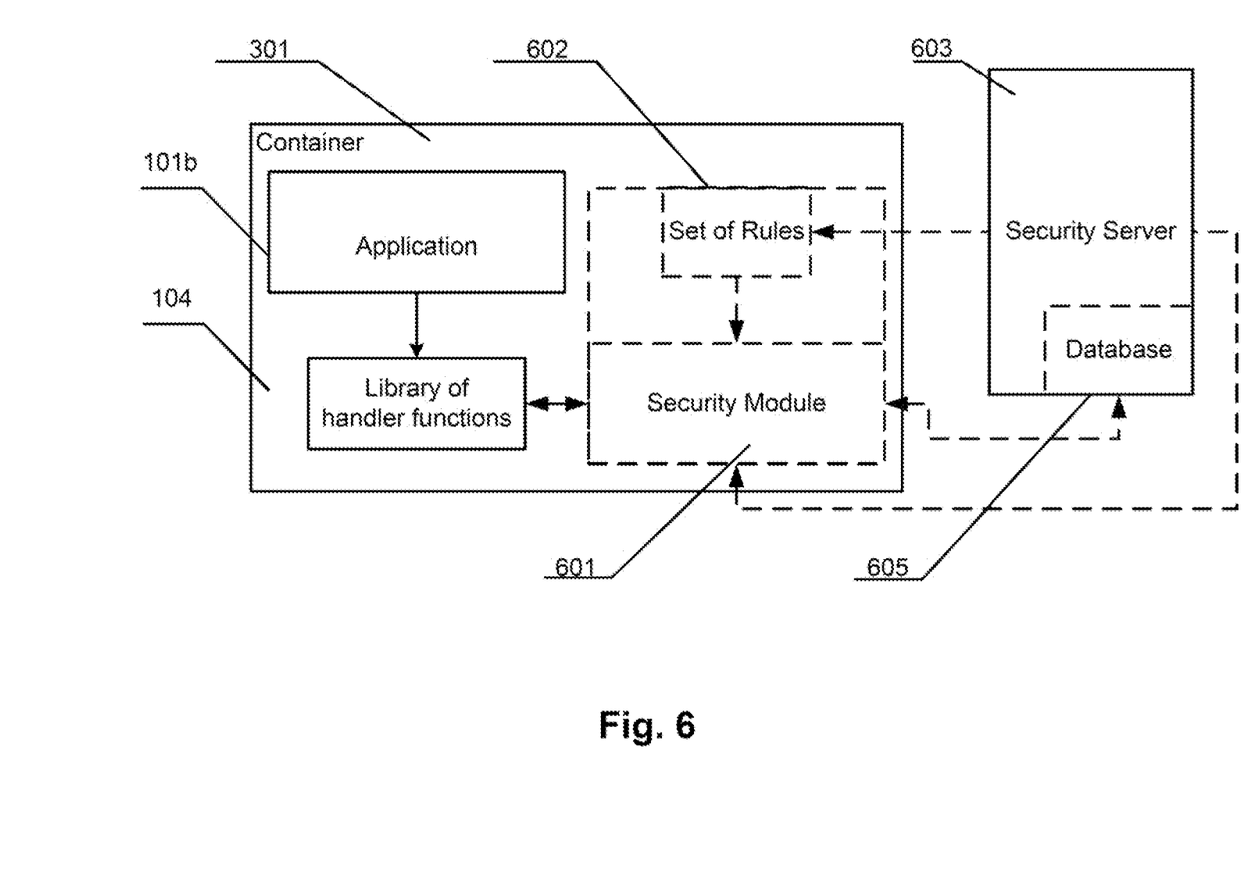
FIG. 6 is a block diagram illustrating the interworking of the components of an application container in accordance with aspects of the present invention.

FIG. 6 shows the interworking of components of an application container in accordance with aspects of the present invention. The methods of the classes used for checking the compliance of application calls with the security policy can be described in the library of handler functions 104 or implemented in the form of a separate component—a security module 601—for ease of updating. The security rules may be stored in the security module 601 or kept in a separate configuration file 602 (e.g., in XML format). The security rules may be updated from the security server 603. The rules may also be kept in a remote database 605.

Figure 7:
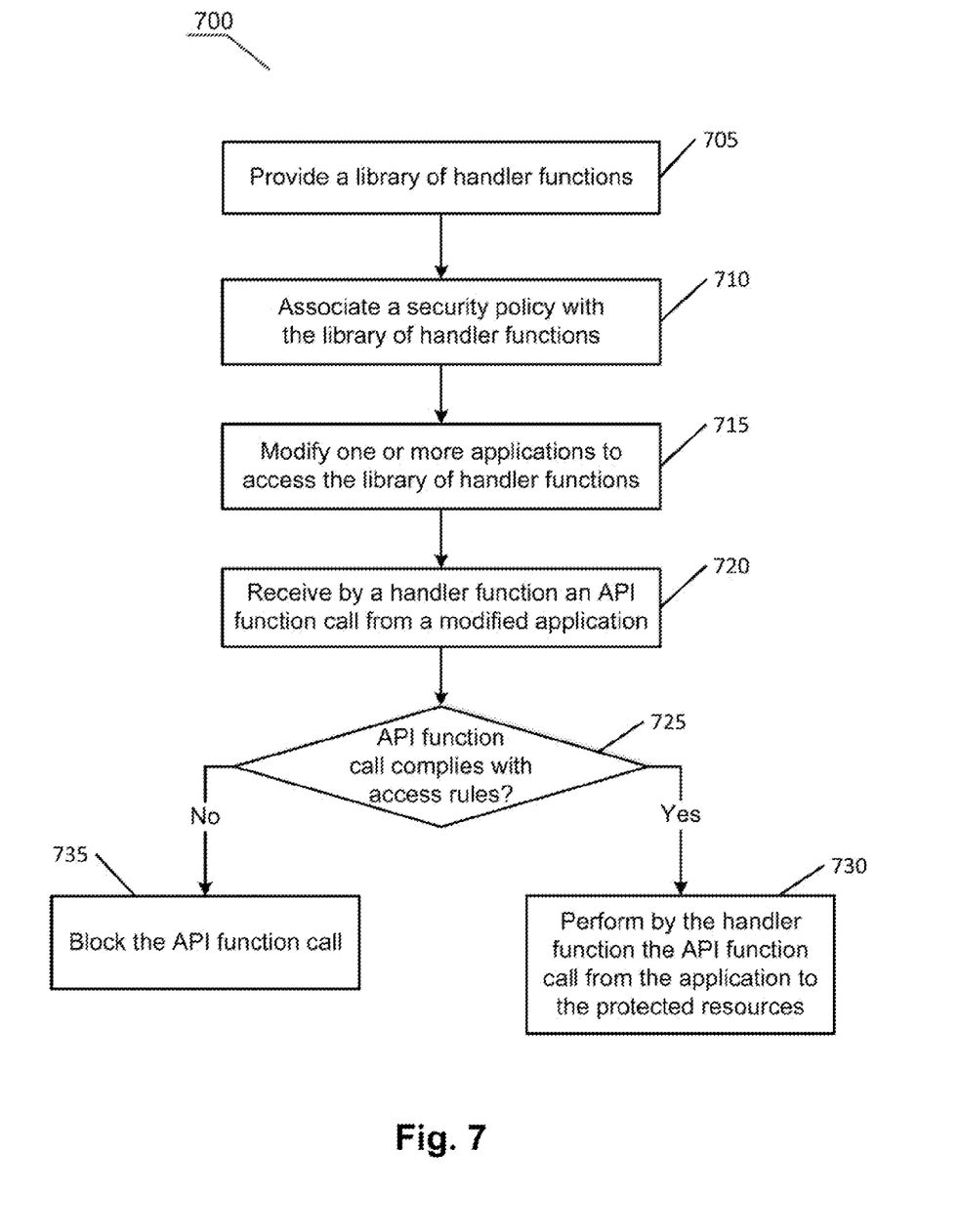
FIG. 7 is a flow diagram illustrating an example method for protecting computer resources from unauthorized access in accordance with aspects of the present invention.

FIG. 7 shows an example method for protecting computer resources from unauthorized access by applications in accordance with aspects of the present invention. At step 705, the method 700 includes providing a library of handler functions. The handler functions control access of one or more applications to protected resources on a computer device, such as a mobile device. In one example aspect, a network security serve, such as server 603 can provide the library of handler functions. At step 710, the method 700 includes associating a security policy with the library of handler functions. The security policy specifies access rules for accessing protected resources by the applications. In one example aspect, the access rules are stored in a configuration file 602 provided in the container 301. At step 715, the method 700 includes modifying one or more applications to access the library of handler functions instead of corresponding application program interface (API) functions of the computer device. In one example aspect, the applications may be modified at the security server 603. In another example aspect, the applications may be modified by special tool kit on the computer device. At step 720, the method 700 includes receiving by a handler function an API function call from a modified application. At step 725, the method 700 includes the handler function determining whether the received API function call complies with the access rules. At step 730, when the API function call complies with the access rules, the method 700 includes performing by the handler function the API function call from the application to the protected resources. At step 735, when the API function call violates the access rules, the method 700 includes blocking by the handler function the API function call from the application.

Figure 8:
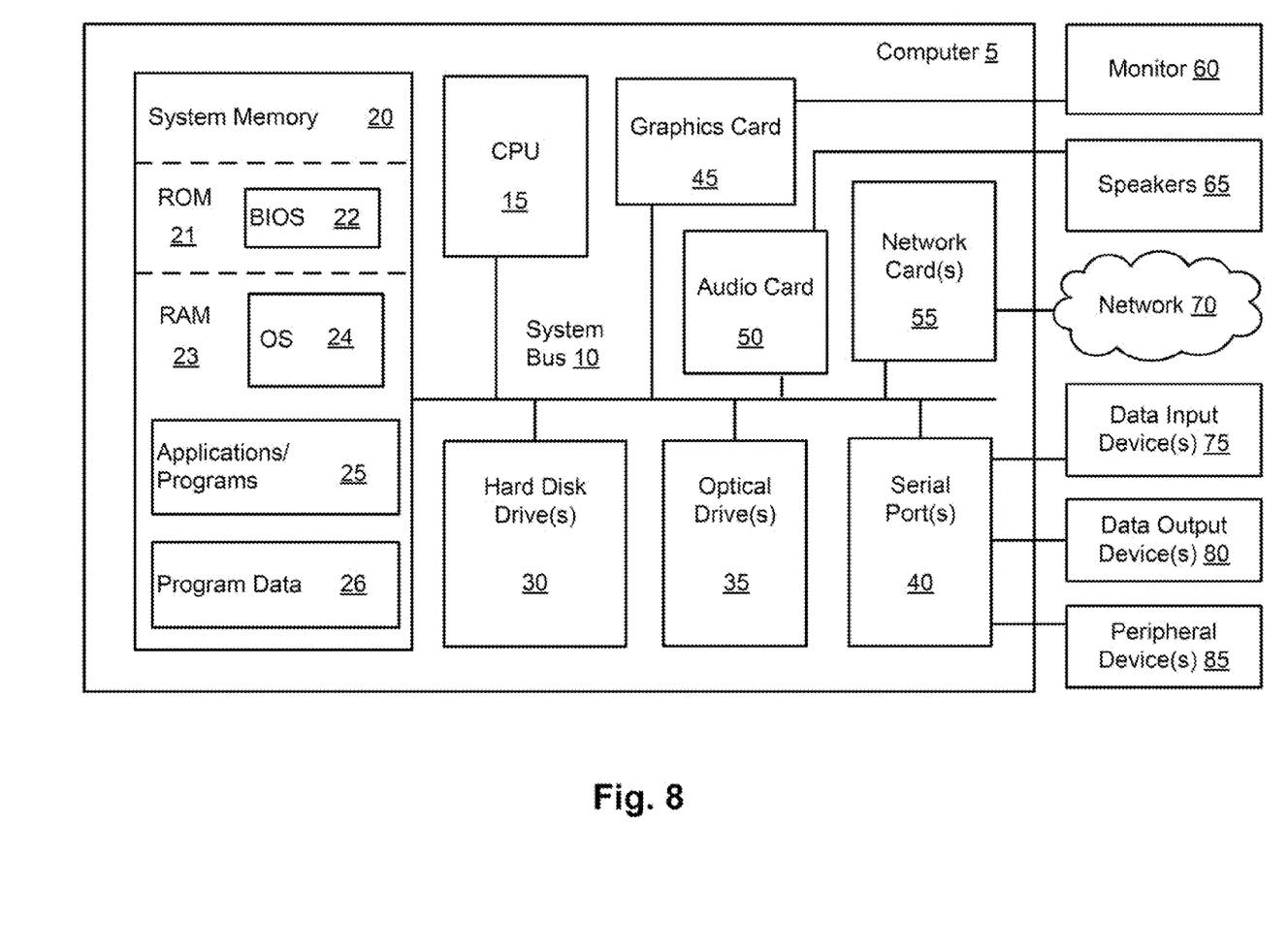
FIG. 8 shows an example of a general-purpose computer system in accordance with aspects of the present invention.

FIG. 8 depicts an example configuration of a general-purpose computer 5 that can be used to implement the disclosed system and methods for protecting computer resources from unauthorized access according to various aspects of the present invention. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HOD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB) for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® Geforce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 8 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting resources from unauthorized access, comprising:
    providing, via a hardware processor, a library of handler functions, where the handler functions control an access of one or more applications to protected resources via a computer device;
    associating a security policy with each of the library of handler functions, where the security policy specifies a first set of access rules for accessing the protected resources on a network by the one or more applications via the computer device and a second set of access rules for accessing the protected resources on the computer device;
    modifying the one or more applications to access the library of handler functions instead of corresponding application program interface (API) functions of the computer device by replacing one or more classes or methods of the one or more applications that perform function calls to the protected resources with one or more function calls to corresponding handler functions contained in the library;
    receiving by a handler function an API function call from a modified application;
    determining whether the received API function call complies with the first and second sets of access rules; and
    when the API function call complies with the first and second sets of access rules, performing by the handler function the API function call from the modified application to the protected resources; and
    when the API function call violates the first and second sets of access rules, blocking the API function call.

2. The method of claim 1, wherein replacing the one or more classes or methods of the one or more applications further comprises replacing the one or more classes or methods contained in an application file having *.dex extension.

3. The method of claim 1, wherein modifying the one or more applications further comprises placing the one or more applications into a container.

4. The method of claim 3, further comprising placing a plurality of applications into the container and associating the security policy with the plurality of applications in the container.

5. The method of claim 1, wherein the protected resources include one or more of network resources, file system, operating system, and other applications or programs.

6. The method of claim 1, wherein the protected resources include encrypted data, and each of the handler functions is utilized in receiving encrypted data, decrypting the encrypted data and transmitting the decrypted data to the modified application.

7. A system for protecting resources from unauthorized access, comprising:
    a memory containing a library of handler functions, where the handler functions are configured to control an access of one or more applications to protected resources via a computer device;
    a hardware processor coupled to the memory and being configured to:
    associate a security policy with each of the library of handler functions, where the security policy specifies a first set of access rules for accessing the protected resources on a network by the one or more applications via the computer device and a second set of access rules for accessing the protected resources on the computer device;
    modify the one or more applications to access the library of handler functions instead of corresponding application program interface (API) functions of the computer device by replacing one or more classes or methods of the one or more applications that perform function calls to the protected resources with one or more function calls to corresponding handler functions contained in the library;
    receive by a handler function an API function call from a modified application;
    determine whether the received API function call complies with the first and second sets of access rules;
    when the API function call complies with the first and second sets of access rules, perform via the handler function the API function call from the modified application to the protected resources; and
    when the API function call violates the first and second sets of access rules, block the API function call.

8. The system of claim 7, wherein to replace the one or more classes or methods of the one or more applications the processor is further configured to replace the one or more classes or methods contained in an application file having *.dex extension.

9. The system of claim 7, wherein to modify the one or more applications the processor is further configured to place the one or more applications into a container.

10. The system of claim 9, wherein the processor is further configured to place a plurality of applications into the container and associate the security policy with the plurality of applications in the container.

11. The system of claim 7, wherein the protected resources include one or more of network resources, file system, operating system, and other applications or programs.

12. The system of claim 7, wherein the protected resources include encrypted data, and the handler functions stored in the memory are configured to receive encrypted data, decrypt the encrypted data and transmit the decrypted data to the modified application.

13. A computer program product embodied on a non-transitory computer-readable storage medium, the computer program product comprising computer-executable instructions for protecting resources from unauthorized access, including instructions for:

provide a library of handler functions, where the handler functions control an access of one or more applications to protected resources via a computer device;

associating a security policy with each of the library of handler functions, where the security policy specifies a first set of access rules for accessing the protected resources on a network by the one or more applications via the computer device and a second set of access rules for accessing the protected resources on the computer device;

modifying the one or more applications to access the library of handler functions instead of corresponding application program interface (API) functions of the computer device by replacing one or more classes or methods of the one or more applications that perform function calls to the protected resources with one or more function calls to corresponding handler functions contained in the library;

receiving by a handler function an API function call from a modified application;

determining whether the received API function call complies with the first and second sets of access rules; and when the API function call complies with the first and second sets of access rules, performing by the handler function the API function call from the modified application to the protected resources; and when the API function call violates the first and second sets of access rules, blocking the API function call.

14. The computer program product of claim 13, wherein the instructions for replacing the one or more classes or methods of the one or more applications further comprise instructions for replacing the one or more classes or methods contained in an application file having *.dex extension.

15. The computer program product of claim 13, wherein the instructions for modifying the one or more applications include instructions for placing the one or more applications into a container.

16. The computer program product of claim 15, further comprising instructions for placing a plurality of applications into the container and associating the security policy with the plurality of applications in the container.

17. The computer program product of claim 13, wherein the protected resources include encrypted data, and each of the handler functions is utilized in receiving encrypted data, decrypting the encrypted data and transmitting the decrypted data to the modified application.

* * * * *